United States Patent [19]

Sakaegi et al.

[11] Patent Number: 5,426,536
[45] Date of Patent: Jun. 20, 1995

[54] SYNCHRONIZING SIGNAL GENERATING DEVICE FOR PLURAL TELEVISION SYSTEMS

[75] Inventors: Yuji Sakaegi; Nobuo Fukushima, both of Kanagawa, Japan

[73] Assignee: Canon Kabushiki Kaisha, Tokyo, Japan

[21] Appl. No.: 305,423

[22] Filed: Sep. 13, 1994

Related U.S. Application Data

[63] Continuation of Ser. No. 56,828, May 3, 1993, abandoned, which is a continuation of Ser. No. 642,177, Jan. 17, 1991, abandoned, which is a continuation of Ser. No. 145,770, Jan. 19, 1988, abandoned.

[30] Foreign Application Priority Data

Jan. 30, 1987 [JP] Japan .................................. 62-019917

[51] Int. Cl.6 .............................................. H04N 5/781
[52] U.S. Cl. ..................... 360/37.1; 358/319; 358/342
[58] Field of Search ............... 358/150, 151, 183, 310, 358/319, 321, 322, 335, 337, 338, 342, 906, 320; 360/37.1, 73.03; 348/521-522, 524, 589, 594

[56] References Cited

U.S. PATENT DOCUMENTS

| | | | |
|---|---|---|---|
| 4,169,659 | 10/1979 | Marlowe | 358/150 |
| 4,498,106 | 2/1985 | Sato et al. | 358/150 X |
| 4,555,735 | 11/1985 | Usuki et al. | 358/906 X |
| 4,575,757 | 3/1986 | Aschwanden | 358/150 |
| 4,584,613 | 4/1986 | Amari et al. | 358/906 X |
| 4,595,953 | 6/1986 | Willis | 358/183 |
| 4,599,611 | 7/1986 | Bowker et al. | 358/183 X |
| 4,614,979 | 9/1986 | Sugiyama et al. | 360/33.1 X |
| 4,647,987 | 3/1987 | Nutting | 358/906 X |
| 4,692,815 | 9/1987 | Kawahara et al. | 358/906 X |
| 4,745,492 | 5/1988 | Kobayashi et al. | 360/33.1 X |

*Primary Examiner*—W. R. Young
*Attorney, Agent, or Firm*—Robin, Blecker, Daley and Driscoll

[57] ABSTRACT

A synchronizing signal generating device of the invention is a device for generating a plurality of kinds of synchronizing signals conformed to two different systems from each other, wherein two kinds of reference signals of different frequencies from each other are caused to generate, and by dividing each of them in frequency at the same frequency division ratio, of the plurality of kinds of synchronizing signals, at least one kind of synchronizing signal conformed to each system can be obtained by a very simple arrangement.

3 Claims, 4 Drawing Sheets

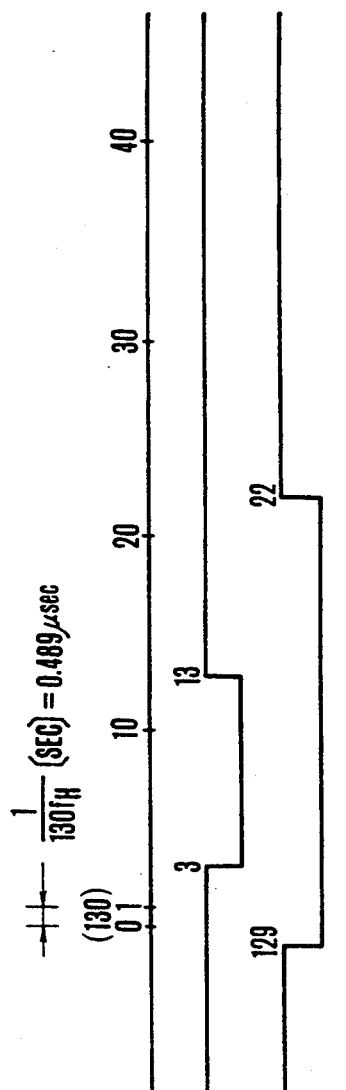
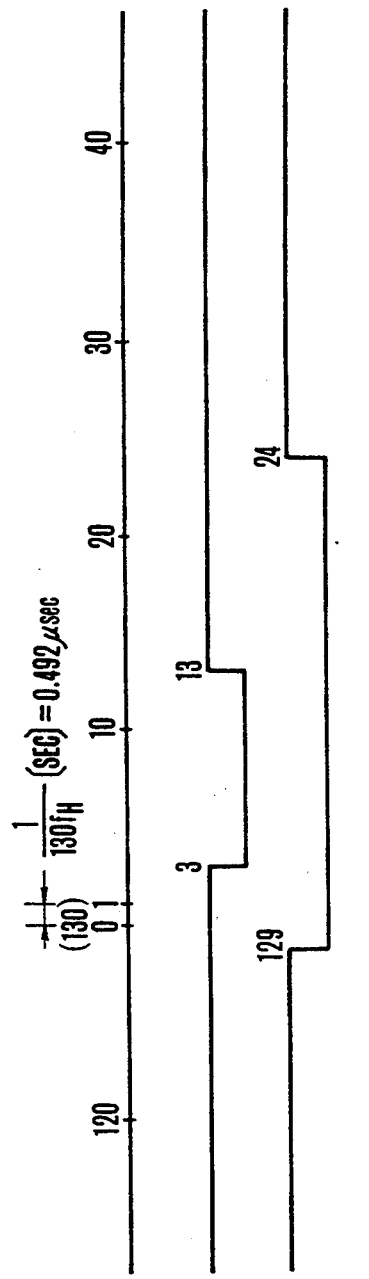

500000
SYNCHRONIZING SIGNAL GENERATING DEVICE FOR PLURAL TELEVISION SYSTEMS

This is a continuation application under 37 CFR 1.62 of prior application Ser. No. 08/056,828, filed May 3, 1993, abandoned, which is a continuation of Ser. No. 07/642,177, filed Jan. 17, 1991, abandoned, which is a continuation of Ser. No. 07/145,770, filed Jan. 19, 1988, abandoned.

BACKGROUND OF THE INVENTION

1. Field of the Invention

This invention relates to synchronizing signal generating devices and, more particularly, to synchronizing signal generating devices for generating synchronizing signals to be outputted together with video signals.

2. Description of the Related Art

The color television scanning method presently used as standard is of the NTSC system in Japan, U.S. and Canada, the PAL system in Western Europe and China, and the SECAM system in France and Eastern Europe. Of these, the PAL and SECAM systems differ from each other only in the method of carrying the color difference signals, but both are basically different from the NTSC system in the scanning standards. For this reason, in the past, to cope with these sets of standards, synchronous signal generating devices (timing signal generating devices) of sole adaptation to each were made and used.

Therefore, inasmuch as the prior known techniques differ, even for a single sort of instrument (product item), the corresponding kinds of timing generating devices to the individual sets of standards had to be designed and manufactured in such ways that one was for adaptation to the NTSC, and the other to the PAL. These became large obstacles to reduction of the development cost and the decrease in cost as a result of mass production.

Summary of the Invention

An object of the invention is to provide a synchronizing signal generating device which can eliminate the above-described problems.

Another object of the invention is to provide a synchronizing signal generating device such that the synchronizing signals, according to sets of standards which are different from each other, can be obtained by simple means.

Under such an object, according to the present invention, as its one embodiment thereof, it is a synchronizing signal generating device for generating a plurality of synchronizing signals based on two sets of standards, which are different from each other, and what is provided is that which has:

reference signal generating means for generating two reference signals of frequencies which are different from each other, and frequency dividing means for dividing the two reference signals produced from the reference signal generating means at the same frequency division ratio to form at least one of the plurality of synchronizing signals which is based on each set of standards.

Also, another object of the invention is to realize a system capable of recording video signals based on the two methods which are different from each other, in simple arrangement.

Under such an object, as one embodiment of the invention, it is a video signal recording system for recording video signals corresponding to a picked-up object image and based on the two methods, which are different from each other, what is provided is that which has:

reference signal generating means for generating two kinds of reference signals of frequencies which are different from each other, first frequency dividing means for frequency-dividing the frequencies of the two kinds of reference signals produced from the reference signal generating means at a same frequency dividing ratio, forming a first synchronizing signal based on at least each method among the plurality of kinds of synchronizing signals, and outputting it, second frequency dividing means for frequency-dividing the reference signals produced from the reference signal generating means in frequency division ratios of two kinds which are different from each other, forming a second synchronizing signal based on each method, and outputting it, image pickup means for picking up an image of an object, and producing a video signal corresponding to the picked-up object image, image pickup control means for driving the image pickup means in synchronism with the first synchronizing signal formed in at least the first frequency dividing means, and recording means for recording the video signal produced from the image pickup means on a recording medium.

Objects of the invention other than those described above and its features will become apparent from the following detailed description of embodiments of the invention by reference to the drawings.

BRIEF DESCRIPTION OF THE DRAWINGS

FIGS. 2(a)–2(c) and FIGS. 3(a)–3(c) are timing charts illustrating the signal produced at the output terminals 7 and 8 of the device shown in FIG. 1 when the operations adapted to the NTSC system and PAL system respectively are performed.

DETAILED DESCRIPTION OF THE PREFERRED EMBODIMENTS

Using the drawings, the present invention is described in detail below.

In the embodiment of the invention to be described below there is disclosed a synchronizing signal generating device such that when in the NTSC system, $525 \times 29.97 \times n$ (n is an integer) in frequency is selected, and when in the PAL (SECAM) system, $625 \times 25 \times n$ (n is the same value as that of n in the NTSC system) in frequency is selected, so that, for the timing signals of both the PAL (SECAM) and NTSC systems, the horizontal synchronizing signal is obtained in the same frequency division ratio.

Figure 1:
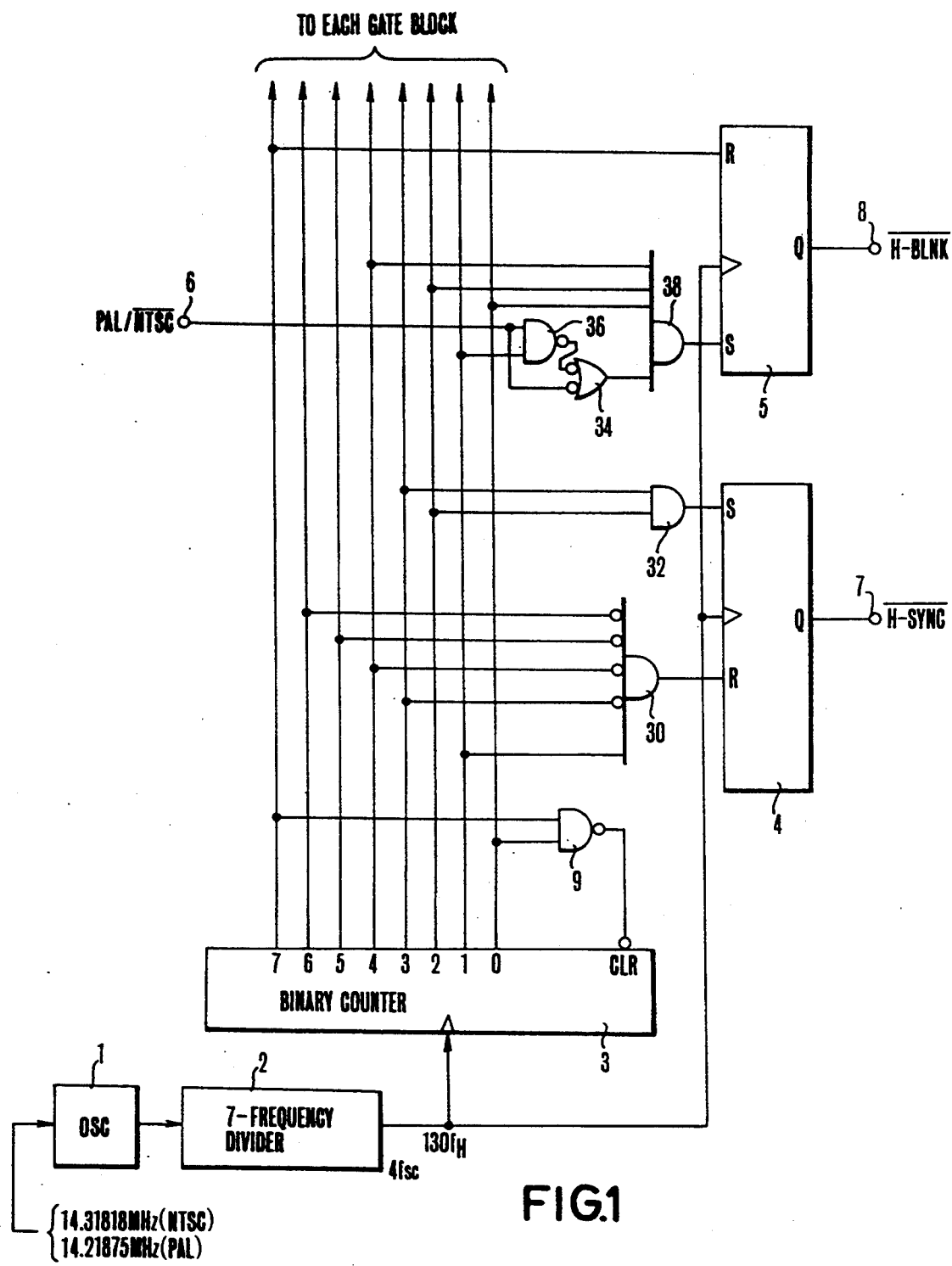
FIG. 1 is a block diagram illustrating the construction and arrangement of a first embodiment of a synchronizing signal generating device according to the invention.

FIG. 1 is a block diagram illustrating the construction and arrangement of the first embodiment of the invention.

FIG. 1 shows the circuit of a synchronizing signal generating device for generating a horizontal synchronizing signal (H-SYNC, negative logic) and and horizontal blanking signal (H-BLNK, negative logic) necessary to PAL, SECAM and NTSC. In FIG. 1, 1 is an oscillator; 2 is a 7-frequency divider; 3 is an 8-bit binary counter having a synchronous clear function; 4 and 5 are S-R flip-flops (S-R F/F) for generating the signals signals H-SYNC and H-BLNK; 6 is an input terminal for indicating which system, PAL, SECAM or NTSC is at hand; and: 7 and 8 are output terminals of the signals H-SYNC and H-BLNK. Here, the oscillator 1 is assumed to be an oscillator that generates 14.31818 MHz (=525×29.97×910=4 fsc), and, if a signal of low level, that is, the signal indicating the NTSC system, is given to the input terminal 6, then the operation is as follows: The output of the oscillator 1 is divided by 7 in frequency to become 2.045 MHz clock signal to be applied to the 8-bit binary counter 3 and the S-R flip-flops (hereinafter S-R F/F) 4 and 5. The counter 3 counts up in response the output of the 7-frequency divider 2. Also, a NAND gate 9 is provided in order to generate a signal for clearing the counter 3 when the 7th and zero bits of the output of the counter 3 become high, namely, when at "129" (decimal number).

Therefore, the counter 3 divides 2.045 MHz by 130 and runs in a period of 63.555 microseconds (=1/(14.31818/7/130)) (see FIG. 2(a)). This corresponds to the period of the horizontal synchronizing signal of the NTSC system. Also, the S-R F/F 4 is reset by a gate 30 when the output of the counter 3 has become "2" and when the next clock enters, and is set by a gate 32 when the output of the counter 3 has become "12" when the next clock enters. Therefore, as shown in the timing chart of FIG. 2(b), it becomes low for a time when the output of the counter 3 is "3"–"13". This is the signal whose period is 63.555 microsec., and which has low level for a time of 4.89 microsec., and can be used as the horizontal synchronizing signal (H-Sync) matched to the standard of the NTSC system. Also, the S-R F/F 5 is reset when the output of the counter 3 becomes "129" and is set by gates 36, 34 and 38 when the output from the input terminal 6 is at a low level and when the output of the counter 3 becomes "22". Therefore, the output terminal 8 of the S-R F/F 5 becomes a signal which has a high level for a time when the output of the counter 3 is "22"–"129" as shown in FIG. 2(c). This is the signal whose period is 63.555 microsec., and which has low level for a time of 11.24 microsec., and can be used as the signal representing the horizontal blanking time (H-BLNK) of the NTSC standards in the negative logic.

In such a manner, in FIG. 1, by using an oscillator for producing 14.31818 MHz in the oscillator 1, the input terminal 6 is set to a low level so that the signals H-SYNC and H-BLNK of the NTSC system can be obtained from the output terminals 7 and 8.

Next, by using another oscillator for producing 14.21875 MHz (=625×25×910) in the oscillator 1, the input terminal 6 is held at a high level. Then, from the output terminal 7, on the basis of an operation similar to the preceding, a signal whose period is 64 microsec., and which has a low level for at time of 4.92 microsec. is obtained as shown in FIG. 3(b). This signal matches the horizontal synchronizing signal of the PAL, SECAM system. Also, the S-R F/F 5 is reset in a similar timing to the preceding, but, in this case, the input terminal 6 is set to a high level. Therefore, the operation differs from the preceding one in that it is set when the output of the counter 3 becomes "24". Therefore, from the output terminal 8, a signal whose period is 64 microsec., and which has a low level for a time of 12.3 microsec. as shown in FIG. 3(c). Therefore, it can be used as the signal H-BLNK representing the horizontal blanking period matched to the standard of the PAL, SECAM system by the negative logic In such a manner, the circuit of FIG. 1 can generate the signals H-SYNC and H-BLNK of both PAL (SECAM) and NTSC, despite being a single circuit, by making use of oscillators of frequencies which are slightly different from each other as the oscillator 1.

Moreover, in this case, even compared with the circuit solely used for PAL (SECAM), or for NTSC, there is almost no increase in the scale of the circuit except for the addition of a few gates. Therefore, both Kinds of synchronizing signals are obtained by simple means. Also, the frequencies of the two sorts of oscillators for NTSC and PAL differ only about 0.7% from each other. Therefore, when designing these circuits, for the necessary calculation of the gate delay, it is sufficient if the case of the NTSC system only is considered.

Figure 4:
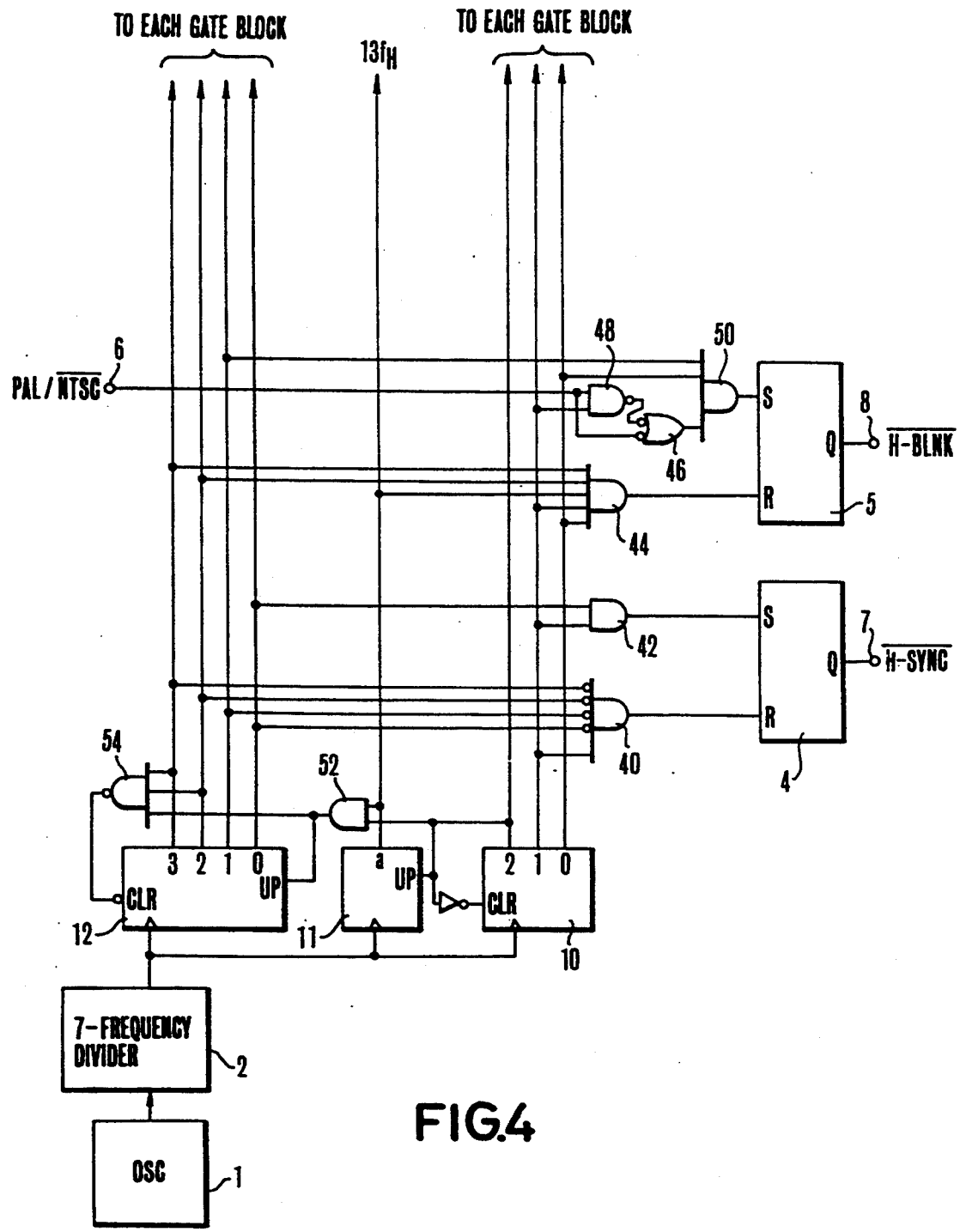
FIG. 4 is a block diagram illustrating the construction and arrangement of a second embodiment of the synchronizing signal generating device according to the invention.

Next, a second embodiment of the present invention is described by using the block diagram of FIG. 4.

The 8-bit binary counter 3 used in the first embodiment is, in the embodiment shown in FIG. 4, separated into a quinary counter 10, a binary counter 11 and a tridecimal counter 12. Also, in FIG. 4, a gate 40 has inputs connected to the first bit of the quinary counter 10 and the zero to third bits of the tridecimal counter 12, and its output is connected to the "Reset" terminal of the R-S F/F 4. Another gate 42 has inputs connected to the first bit of the quinary counter 10 and the zero bit of the tridecimal counter 12, and its output is connected to the "Set" of the R-S F/F 4. Another gate 44 has inputs connected to the zero and first bits of the quinary counter 10, the zero bit of the binary counter 11 and the second and third bits of the tridecimal counter 12, and its output is connected to the "Reset" terminal of the R-S F/F 5. Another gate 48 has inputs connected to the input terminal 6 and the first bit of the quinary counter 10. Another gate 46 has inputs connected to the input terminal 6 and the output of the gate 48. Another gate 50 has inputs connected to the output of the gate 46, the zero bit of the quinary counter 10 and the first bit of the tridecimal counter 12, 52 and 54 are gates for producing reset signals to constitute the binary and tridecimal counters 11 and 12 respectively.

In such an embodiment, though a detailed explanation is omitted for the purpose of clarity, by the construction and arrangement of the divided-to-3 counters and each gate 40–54, exactly the same operation as that of the counter 3 and each gate 30–38 shown in FIG. 1 is performed so that the signals H-SYNC and H-BLNK shown in FIGS. 2(a)–2(c) and FIGS. 3(a)–3(c) are obtained.

Further, in this embodiment, the output of the binary counter 11 becomes 13 fH (fH is the frequency of the horizontal synchronizing number). Therefore, for example, if the synchronizing signal generating device of this embodiment is used as the synchronizing signal generating device of the electronic still camera, it is very advantageous. That is, in the electronic still camera, because the frequency 13 fH is necessary to record the ID code that is recorded along with the video signal on the medium, if, in the embodiment shown in FIG. 1, such a signal of the frequency of 13 fH is to be obtained, one additional gate is necessary. But, in the embodiment of FIG. 4, without the necessity of such a gate, the frequency of 13 fH can be obtained.

Next, a practical example of application of the synchronizing signal generating device of the invention into the electronic still camera is described.

Figure 5:
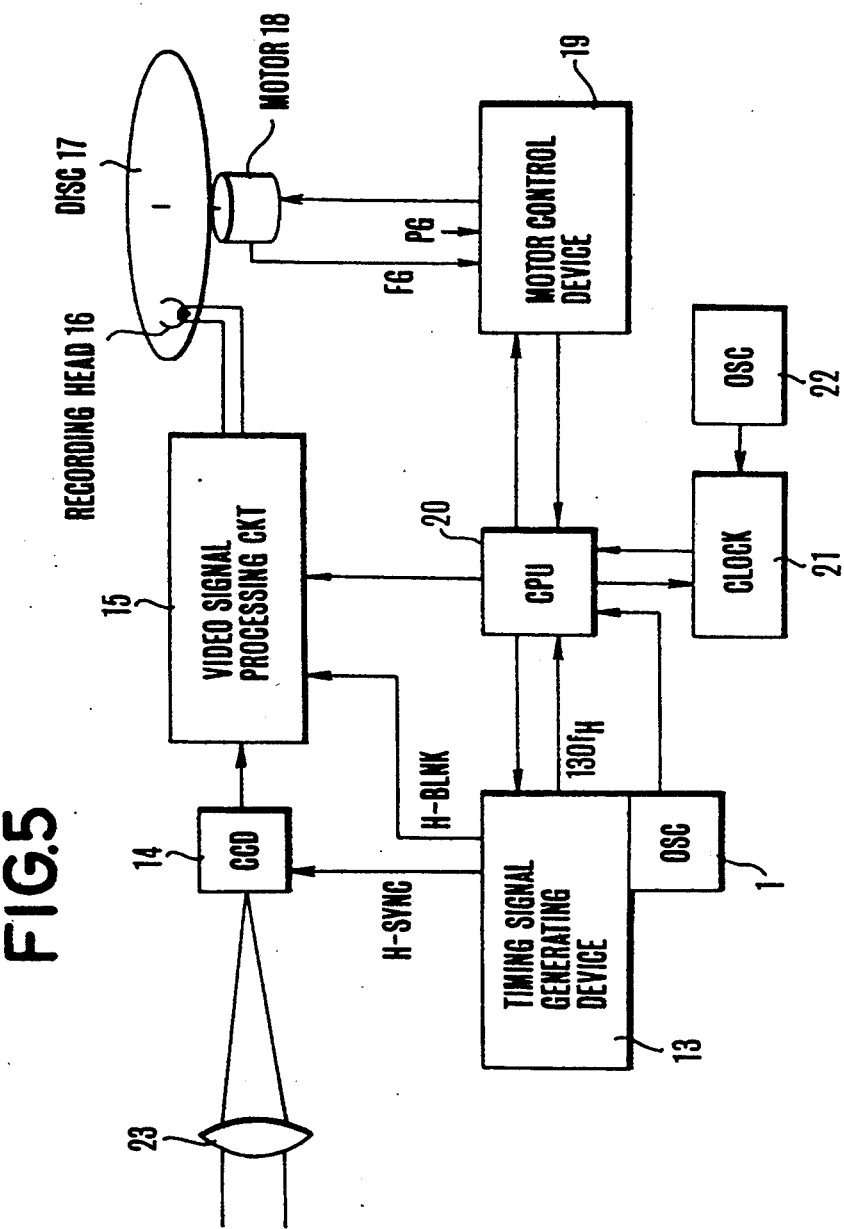
FIG. 5 is a schematic diagram illustrating an example of application of the synchronizing signal generating device of the invention to the electronic camera.

FIG. 5 is a block diagram illustrating the construction of such an electronic camera.

In FIG. 5, 13 denotes the timing signal generating device shown in FIG. 1 or FIG. 4. An optical image formed by a lens 23 is converted to an electrical signal by a solid state image pickup element 14. A processing circuit 15 converts the output of the solid state image pickup element 14 to a signal to be recorded on a magnetic disc 17. 16 is a recording head. The magnetic disc 17 is rotated by an electric motor 18. The motor 18 is controlled by a motor control device 19. A CPU 20 controls the electronic camera. A clock-calendar 21 generates a date to be recorded together with the image. 22 is an oscillator for the clock-calender 21. In this embodiment, the output of the oscillator 1 is supplied to the timing signal generating device 13 and also used as the standard clock for the CPU 20.

Also, in this embodiment, in response to the horizontal synchronizing signal and vertical synchronizing signal produced from the timing signal generating device 13, the solid state image pickup element 14 is driven, and the blanking signal, etc., is added by the video signal processing circuit 15.

If the synchronizing signal generating device of the invention is incorporated into such an apparatus, regardless of whether it is the PAL system or the NTSC system, it is only required that the common unit is incorporated into the apparatus, the level of the input terminal 6 shown in FIG. 1 or FIG. 4 is changed, and the oscillator 1 which becomes the standard is interchanged. Therefore, there is no trouble of assembling it, and it is very convenient.

In the case of taking such an arrangement, as the input level determining method of the input terminal 6 in FIG. 1 or FIG. 4, various things can be considered. At first, a method is considered that the input terminal 6 is made an input pin of the timing signal generating device 13 (usually IC), and the changing-over is effected on the substrate by a jumper wire or a switch.

Also, a changing-over system by the control of the CPU 20 is considered. There is the method of connecting the input terminal 6 and the output port of the CPU 20 directly with each other, or the method that a "command" is given from the CPU 20 to the timing signal generating device 13, in other words, the CPU 20 writes particular data in an internal F/F (not shown) of the timing signal generating device 13, and the output of that F/F determines the level of the input terminal 6. Also, in the case of such dependence on the control of the CPU 20, some more methods of altering the control of the CPU 20 can be considered:

the program of the CPU 20 is altered from system to system;

the input terminal (not shown) of the CPU 20 is changed over by a jumper wire or a switch; and the frequency of the oscillator 1 is measured with the frequency of the oscillator 22 for the clock as the standard to effect automatic discrimination, etc., are considered. The use of any of these methods is included within the scope of the invention.

In these embodiments, as an example, the circuit for generating the signals H-BLNK and H-SYNC has been shown. But, it may be constructed so that even other synchronizing signals necessary to both systems, for example, the vertical synchronizing signal, are generated.

Also, as an example of application, an example of the electronic camera has been cited. But, the present invention is not confined thereto and can be used even in other apparatus (in particular, if it is the system which does not necessitate the subcarrier color frequency).

For note, in this embodiment, the oscillation frequency of the oscillator 1, in the case of the NTSC system 14.31818 MHz is selected, and in the case of the PAL system, 14.21875 MHz is selected. But, frequencies other than such frequencies may be used as a matter of course. In the following, examples of such frequencies are shown.

| NTSC | PAL |
| --- | --- |
| 10.73863 | 10.66406 (MHz) |
| 14.31818 | 14.21875 |
| 21.47727 | 21.32813 |
| 28.63636 | 28.43750 |
| 42.95454 | 42.65625 |
| 57.27272 | 56.87500 |
| 85.90908 | 85.31250 |
| 12.27273 | 12.18750 |
| 16.36363 | 16.25000 |
| 24.54545 | 24.37500 |
| 32.72727 | 32.50000 |
| 49.09090 | 48.75000 |
| 65.45453 | 65.00000 |
| 98.18180 | 97.50000 |

As has been described above, according to this embodiment, by slightly altering the frequency of the oscillator and setting the system changeover terminal, it becomes possible to perform generation of the timing signals of both of the PAL (SECAM) system and the NTSC system by a single device. The same device is, in many cases, realized usually in the form of a one-chip IC, and can contribute to a cost reduction given mass production thereof.

Also, the two kinds of frequencies in this third embodiment differ only by as little as about 0.7%, and the gate delay calculation necessary at the time of design of the circuit also may be sufficient when only the case of one of them (the one having the higher frequency) is taken into account. Therefore, there are advantages obtained such as shortening the time of development of the device, and reducing the cost of the development. Further, even in the stage of the manufacturing of the products, the production lines of both systems or the PAL (SECAM) and NTSC can be made common. Therefore, it can contribute to a reduction of the production cost of the articles in which the invention is incorporated.

What is claimed is:

1. A signal generating device for generating a plurality of kinds of signals conformed to a first television system or a second television system which is different from said first television system, comprising:
 a) a single frequency-divider for receiving either one of a first reference signal having a frequency corresponding to that of said first television system or a second reference signal having a frequency corresponding to that of said second television system and different from the frequency of said first reference signal, and for frequency dividing said received first reference signal or second reference signal at a predetermined frequency-dividing ratio and outputting the frequency-divided reference signal;

b) signal forming means for forming a first horizontal synchronizing signal conformed to said first television system and a first frequency signal having a frequency conformed to said first television system which is of thirteen times the frequency of said first horizontal synchronizing signal, by performing a counting operation by a first counter in synchronism with the frequency divided signal of said first reference signal output from said single frequency divider, in a case where said single frequency divider receives said first reference signal and outputs the frequency-divided signal of said first reference signal, and for forming a second horizontal synchronizing signal conformed to said second television system and a second frequency signal having a frequency conformed to said second television system which is thirteen times the frequency of said second horizontal synchronizing signal by performing a counting operation by an additional counter, which is different from said first counter in a count up timing, in synchronism with said frequency-divided signal of said second reference signal outputted from said single frequency-divider, in a case where said single frequency divider receives the second reference signal and outputs said frequency-divided signal of said second reference signal; and c) modulated information signal generating means for forming a first modulated information signal by phase modulating the first frequency signal outputted from said signal forming means in accordance with another information signal different from an image signal and outputting the first modulated information signal, said first frequency signal being adopted as a carrier signal, or for forming a second modulated information signal by phase modulating the second frequency signal outputted from said signal forming means in accordance with said another information signal and outputting the second modulated information signal, said second frequency signal being adopted as the carrier signal.

2. A signal generating device for generating a plurality of kinds of signals conformed to a first television system or to a second television system which is different from said first television system, comprising:

a) a single frequency-divider for receiving either one of a first reference signal having a frequency corresponding to that of said first television system or a second reference signal having a frequency corresponding to that of said second television system and different from the frequency of said first reference signal, and for frequency dividing said received first reference signal or second reference signal at a predetermined frequency-dividing ratio and outputting the frequency-divided reference signal;

b) signal forming means for forming a first horizontal synchronizing signal conformed to said first television system and a first frequency signal having a frequency conformed to said first television system which is of thirteen times the frequency of said first horizontal synchronizing signal, by performing a counting operation by a first counter in synchronism with the frequency-divided signal of said first reference signal output from said single frequency-divider, in a case where said single frequency-divider receives said first reference signal and outputs the frequency-divided signal of said first reference signal, and for forming a second horizontal synchronizing signal conformed to said second television system and a second frequency signal having a frequency conformed to said second television system which is thirteen times the frequency of said second horizontal synchronizing signal by performing a counting operation by an additional counter, which is different from said first counter in a count up timing, in synchronism with the frequency-divided signal of said second reference signal output from said single frequency-divider, in a case where said single frequency-divider receives the second reference signal and outputs the frequency-divided signal of said second reference signal;

c) image pickup means for picking up an image of an object to be photographed and generating a first image signal and a second image signal corresponding to the picked-up object image;

d) image pickup control means for driving said image pickup means in synchronism with said first horizontal synchronizing signal formed by said signal forming means in conformity with said first television system to generate said first image signal conformed to said first television system or in synchronism with said second horizontal synchronizing signal formed by said signal forming means in conformity with said second television system to generate said second image signal conformed to said second television system; and e) modulated information signal generating means for forming a first modulated information signal by phase modulating the first frequency signal outputted from said signal forming means in accordance with another information signal different from an image signal and outputting the first modulated information signal, said first frequency signal being adopted as a carrier signal, or for forming a second modulated information signal by phase modulating the second frequency signal outputted from said frequency forming means in accordance with said another information signal and outputting the second modulated information signal, said second frequency signal being adopted as the carrier signal; and f) recording means for recording said first image signal generated by said image pickup means and the first information signal generated by said modulated information signal generating means on a recording medium in accordance with said first horizontal synchronizing signal outputted from said signal forming means or recording said second image signal generated by said image pickup means and the second information signal generated by said modulated information signal generating means on the recording medium in accordance with said second horizontal synchronizing signal outputted from said signal forming means.

3. A signal generating device according to claim 2, wherein said recording medium includes a magnetic disc.

* * * * *

UNITED STATES PATENT AND TRADEMARK OFFICE
CERTIFICATE OF CORRECTION

PATENT NO. : 5,426,536
DATED : June 20, 1995                    Page 1 of 2
INVENTOR(S) : Yuji Sakaegi et al.

It is certified that error appears in the above-indentified patent and that said Letters Patent is hereby corrected as shown below:

Col. 1, line 48. After "to" insert -- two --.

Col. 3, line 6. Change "H-SYNC" to -- $\overline{\text{H-SYNC}}$ --.

Col. 3, line 7. Change "H-BLNK" to -- $\overline{\text{H-BLNK}}$ --.

Col. 3, line 12. Change "H-SYNC" to -- $\overline{\text{H-SYNC}}$ -- and "H-BLNK" to -- $\overline{\text{H-BLNK}}$ --.

Col. 3, line 15. Change "H-SYNC" to -- $\overline{\text{H-SYNC}}$ -- and "H-BLNK" to -- $\overline{\text{H-BLNK}}$ --.

Col. 3, line 21. After "become" insert -- a --.

Col. 3, line 58. Change "H-" to -- $\overline{\text{H-}}$ --.

Col. 3, line 59. Change "SYNC" to -- $\overline{\text{SYNC}}$ -- and "H-BLNK" to -- $\overline{\text{H-BLNK}}$ --.

Col. 4, line 9. Change "H-BLNK" to -- $\overline{\text{H-BLNK}}$ --.

Col. 4, line 13. Change "H-SYNC" to -- $\overline{\text{H-SYNC}}$ -- and "H-BLNK" to -- $\overline{\text{H-BLNK}}$ --.

Col. 4, line 50. Change "," to -- . --.

Col. 4, line 58. Change "H-SYNC" to -- $\overline{\text{H-SYNC}}$ -- and "H-BLNK" to -- $\overline{\text{H-BLNK}}$ --.

UNITED STATES PATENT AND TRADEMARK OFFICE
CERTIFICATE OF CORRECTION

PATENT NO. : 5,426,536
DATED : June 20, 1995
INVENTOR(S) : Yuji Sakaegi et al.

Page 2 of 2

It is certified that error appears in the above-indentified patent and that said Letters Patent is hereby corrected as shown below:

Col. 6, line 3. Change "H-SYNC" to -- $\overline{\text{H-SYNC}}$ -- and "H-BLNK" to -- $\overline{\text{H-BLNK}}$ --.

Signed and Sealed this

Twenty-first Day of November, 1995

Attest:

BRUCE LEHMAN

Attesting Officer

Commissioner of Patents and Trademarks